United States Patent [19]
Plegat

[11] 3,808,923
[45] May 7, 1974

[54] APPARATUS FOR CUTTING CONTINUOUSLY ADVANCING TUBES

[75] Inventor: Alain Edouard Plegat, Asnieres, France

[73] Assignee: Societe Anonyme Des Usines Chausson, Hauts de Seine, France

[22] Filed: Oct. 27, 1971

[21] Appl. No.: 193,003

[30] Foreign Application Priority Data
Nov. 27, 1970 France .............................. 70.42727

[52] U.S. Cl...................... 83/196, 83/319, 83/320, 83/642
[51] Int. Cl....................... B23d 21/00, B23d 25/04
[58] Field of Search ............................. 83/196–199, 83/644–646, 647.5, 319, 320, 580, 642, 318

[56] References Cited
UNITED STATES PATENTS

| | | | |
|---|---|---|---|
| 3,292,472 | 12/1966 | McKenica.......................... | 83/319 X |
| 3,664,221 | 5/1972 | Breetvelt............................. | 83/196 |
| 1,498,550 | 6/1924 | Johnston............................. | 83/319 |
| 3,513,740 | 5/1970 | Burghart........................... | 83/646 X |
| 2,540,166 | 2/1951 | Frank et al. ...................... | 83/319 X |
| 1,916,991 | 7/1933 | Roberts............................. | 83/320 X |
| 2,258,348 | 10/1941 | Biggert, Jr. ...................... | 83/578 X |

Primary Examiner—J. M. Meister
Attorney, Agent, or Firm—Imirie and Smiley

[57] ABSTRACT

The apparatus comprises a shearing device including a single plate with a substantially rectangular opening surrounded by a sharpened edge, said plate being positioned perpendicularly to the longitudinal axis of a continuously moving tube to be cut. The tube, which may have a substantially rectangular shape, passes through the opening which is angularly disposed relative to the tube. Advancing mechanism moves the plate with and at the same speed as that of the tube and means subject the plate to reciprocation transverse the axis of the tube, thereby severing the tube by the sharpened edge surrounding the rectangular opening.

6 Claims, 5 Drawing Figures

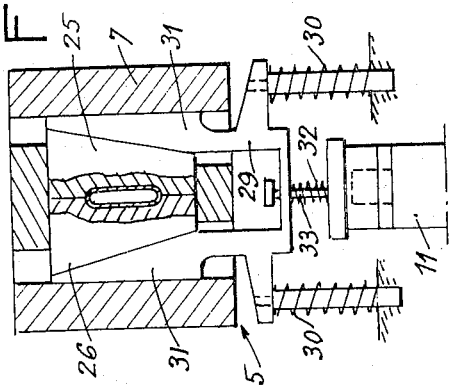
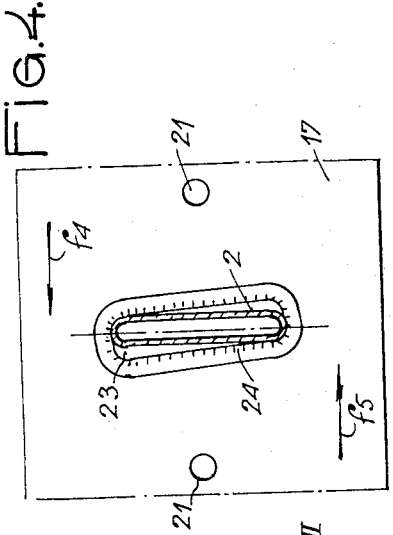
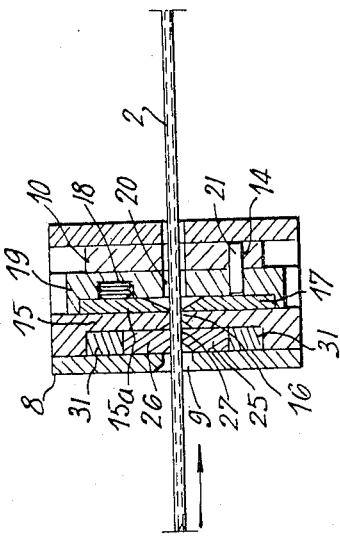
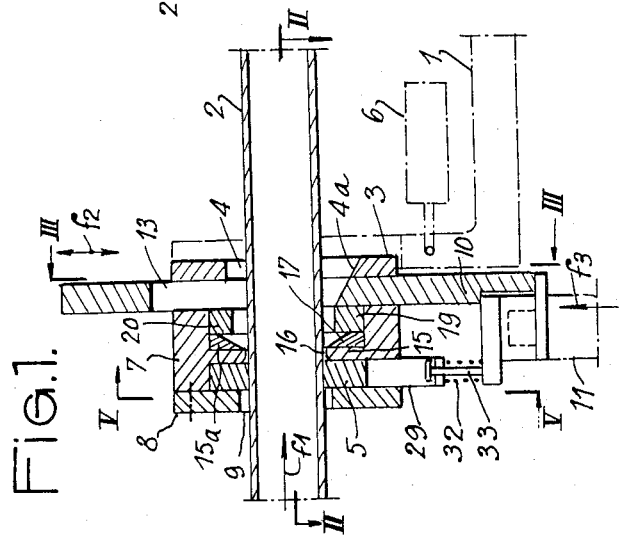
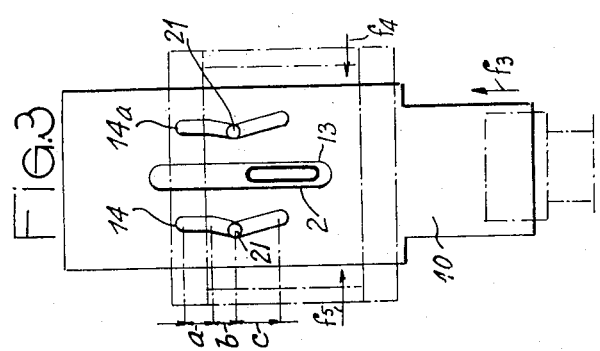

APPARATUS FOR CUTTING CONTINUOUSLY ADVANCING TUBES

BACKGROUND OF THE INVENTION

The high speed cutting of tubes is a very great problem in some fields, particularly in the radiator industry where tubes, more especially flat section tubes, are manufactured at high speed.

Up to now, and particularly for tubes made of brass, aluminium or stainless steel, materials which are most usually utilized, saws with a pendular motion have been generally used; said saws performing the cutting at a moment of their cycle during which the translation speed of the saw cutting edge is the same as the advance speed of the tube. Said pendular saw devices require frequent blade change and this disadvantage is compounded when said devices are cutting tubes made of hard metal such as stainless steel.

SUMMARY OF THE INVENTION

The purpose of this invention is the embodiment of a new cutting apparatus making possible very neat cuts without any chips or waste, whatever the material of the tube.

According to the invention, the apparatus is characterized by a shearing device constituted by a single plate having an elongated opening with a sharpened edge and an axis rotated with respect to the axis of the substantially rectangular cross-section of the tube. The plate is placed – relative to the direction of the tube advance — downstream from a guide for said tube. Means of being further provided, on one hand to move the shearing device at the same linear speed as the tube, and on the other hand, to subject said shearing device to an alternating motion transverse to the longitudinal axis of the tube, whereby the sharpened edge defining the opening of the single plate is applied to the whole periphery of thereby shears said tube.

BRIEF DESCRIPTION OF THE DRAWINGS

FIG. 1 is a diagrammatic sectional view of the cutting device of the invention:

FIG. 2 is a sectional view made substantially on line II—II of FIG. 1:

FIG. 3 is a sectional elevation view on line III—III of FIG. 1:

FIG. 4 is and elevation view of a part of the cutting device shown in FIGS. 1 and 2, and FIG. 5 is a sectional elevation view made substantially on line V—V of FIG. 1.

DETAILED DESCRIPTION OF THE INVENTION

As particularly shown in FIG. 1, the device is generally supported by a carriage 1 designed to be moved forward at the same speed as the speed of advance of a tube 2 to be shear.

The tube 2, is continuously advanced in the direction of arrow $f_1$. The tube can be of various shapes but the invention is more particularly concerned with tubes of which the cross-sections have substantially a rectangular shape with curved small sides. Tubes of such types may be particularly utilized in the heat exchanger field, especially in cooling radiators. The tubes 2 can be made of brass, copper, aluminum or stainless steel or of any other material without modification of the device.

The carriage 1 supports a frame 3 having an aperture 4, which aperture preferably has a beveled lower edge 4a, for the passage of the tube 2.

A mechanism 5 is provided to temporarily secure the tube 2 to the carriage 1 at of moment the cutting. The carriage 1 is connected to a jack 6 designed, on one hand, to ensure the return of said carriage, and on the other hand, when necessary, to help the forward motion of said carriage in the direction of arrow $f_1$ in order to prevent stress being applied to the tube 2 by the tubes driving of said carriage.

The control and feeding mechanism of the jack 6 provided to perform the above mentioned functions being well known in the art and not being a direct part of the invention, is not described is more detail in the following disclosure.

The frame 3 is rigidly connected, for example by its upper and lower sides, to a casing 7 having a front face 8 in which there is a widened inlet 9 for the tube 2. The casing 7 is used as a guide for a sliding plate 10 which can be moved in the direction of arrow $f_2$. The motion of the sliding plate 10, which is an alternating motion, is controlled through a jack 11.

As represented in FIGS. 1 and 3, the sliding plate 10 is provided, at right angles with the tube 2, with an elongated slot 13 and with two apertures 14 and 14a, on each side of said slot. In this embodiment, these apertures have three separate portions, namely a portion a parallel to slot 13, a portion b inclined in a given direction and a portion c inclined in the direction opposite to the direction of the portion b. The casing 7 is also used for maintaining a guide 15 constituted by a plate having an aperture 16 with a shape and size exactly corresponding to the shape and size of the outer wall of the tube 2. Through this aperture the tube may slide with low friction.

The guide 15 has a face 15a against which a shearing device 17 is applied through the action of springs 18 (FIG. 2) housed and maintained in a plate 19 having an opening 20 for the passage of the tube 2. Plate 19 carries two pins 21 respectively engaged in apertures 14 and 14a of the sliding plate 10.

As shown on FIG. 4, the shearing device 17 is constituted by a single plate provided with an opening 23, the cutting edge 24 thereof extending around its whole periphery. The opening 23 is angularly disposed with respect to the tube 2. The size of said opening permits the tube 2 to move forward without coming into contact with the cutting edge, when pins 21 are in the zone a of apertures 14 and 14a.

FIG. 5 shows an embodiment of the mechanism 5 placed before the guide 15 and shearing device 17. Two jaws 25 and 26, guided by and housed in a recess in the casing 7, defines between them an opening 27 having shape and size corresponding to the shape and size of the tube 2. A holder 29 pushed by springs 30 has wedge-shaped ends 31 which bears on the inclined lateral sides of the jaws 25, 26. The holder 29 is guided by the casing 7 and is connected, for example through a spring 32, to the jack 11, said jack controlling the sliding plate 10. A return pin 33 is designed for releasing the holder 29.

The device operates as follows:

Assuming the sliding plate 10 of FIG. 2 is lowered to let the pins 21 be at the upper part of the portion a of apertures 14 and 14a, the holder 29 of the mechanism 5 is lowered and consequently the jaws 25, 26 are separated, whereby the tube 2 can freely move forward according to arrow $f_1$ by passing through the opening 23 of the shearing device 17.

When a sufficient length of tube 2 has come forwards — which can be determined by many well-known means in the art, the jack 11 is fed and starts to slide in the direction of arrow $f_3$, this moving the sliding plate 10 in the same direction.

While pins are travelling the portion $a$ of the apertures 14, 14a, no motion is transmitted to the plate 19 supporting the shearing device 17, consequently said shearing device does not move. However, the jack 11, by lifting pin 33, allows the springs 30 to release and consequently the holder 29 tightens the jaws 25, 26 on the tube 2, thereby securing the whole device to said tube. An auxiliary control, not shown enables — if required — the operation of jack 6 to help the motion of carriage 1 in the direction of arrow $f_1$.

The sliding plate 10 continues its rising motion and the pins 21 correspondingly begin to travel along the inclined portion $b$ of apertures 14 and 14a, thereby moving the shearing device 17 in reference to FIG. 3, toward the left side. In reference to FIG. 4, such motion being indicated by arrow $f_4$ upon completion of such motion the tube is half cut. Then the pins 21 follow the oppositely inclined portion $c$ of apertures 14, 14a and correspondingly the shearing device 17 is first returned to the original position thereof, then moved according to the direction of arrow $f_5$, FIG. 4, thus cutting the other half of tube 2. Then the jack 11 performs the return stroke thereof, opposite to the direction of $f_3$, causing the pins 21 to travel the portion $a$ of apertures 14, 14a, the pin 33 causing retraction of the holder 29, thus releasing the cut portion of tube 2.

The invention is not restricted to the embodiment shown and described in detail, for various modifications can be applied to it without departing from the scope of the invention.

I claim:

1. Apparatus for shearing selected lengths from a continuously moving tube having a substantially rectangular cross-section, comprising means for guiding a tube axially along a path as the tube is moved continuously, shearing means including a plate disposed perpendicularly across said tube path and having a substantially rectangular opening surrounding said path for passage of a tube therethrough, said opening being angularly disposed to the cross-section of the tube and at least the longer sides thereof being constituted by sharpened edges, means for moving said shearing means along said tube path at the same linear speed as the tube, and means for reciprocating said plate transversely of said tube path to cause the sharpened edges of said opening to sever the tube, said plate being slidably mounted on a support which is transversely movable in relation to said tube path by means of a slidable member having cam slots cooperative with cam pins respectively inserted through said slots.

2. Apparatus as set forth in claim 1, comprising a carriage supporting said shearing means and guide means and which is moved in along said tube path at same speed as the tube.

3. Apparatus as set forth in claim 2, comprising gripping mechanism on said carriage and controlled by said slidable member to grip the tube to drive said carriage at same speed as the tube.

4. Apparatus as set forth in claim 3, wherein a jack is provided for controlling the slidable member and the mechanism, said jack being supported by the mobile carriage, the cam slots of the slidable member having a dead area for operation of said shearing means, said dead area corresponding to operation of the gripping mechanism through the jack.

5. Apparatus as set forth in claim 4, comprising an additional jack to help advance said carriage when said carriage is driven by the tube and to return said carriage to start position after shearing off a length of tube.

6. Apparatus as set forth in claim 4, wherein a resilient component is placed between the jack supported by the carriage and a holder controlling the gripping mechanism, whereby said mechanism is actuated to grip the tube at start of a jack stroke, motion of said jack being then compensated by said resilient component during motion of the shearing means controlled by the same.

* * * * *